United States Patent
Herdagdelen et al.

(10) Patent No.: US 10,013,417 B2
(45) Date of Patent: *Jul. 3, 2018

(54) CLASSIFYING LANGUAGES FOR OBJECTS AND ENTITIES

(71) Applicant: Facebook, Inc., Menlo Park, CA (US)

(72) Inventors: Amac Herdagdelen, Mountain View, CA (US); Bradley Ray Green, Snohomish, WA (US)

(73) Assignee: FACEBOOK, INC., Menlo Park, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/652,175

(22) Filed: Jul. 17, 2017

(65) Prior Publication Data

US 2017/0315988 A1    Nov. 2, 2017

Related U.S. Application Data

(63) Continuation of application No. 15/445,978, filed on Feb. 28, 2017, which is a continuation of application No. 14/302,032, filed on Jun. 11, 2014, now Pat. No. 9,740,687.

(51) Int. Cl.
| | |
|---|---|
| G06F 17/28 | (2006.01) |
| H04L 29/08 | (2006.01) |
| G06F 17/27 | (2006.01) |
| G06Q 10/00 | (2012.01) |

(52) U.S. Cl.
CPC ............ *G06F 17/28* (2013.01); *G06F 17/275* (2013.01); *G06Q 10/00* (2013.01); *H04L 67/02* (2013.01)

(58) Field of Classification Search
USPC ....................................................... 704/2–10
See application file for complete search history.

(56) References Cited

U.S. PATENT DOCUMENTS

| | | | |
|---|---|---|---|
| 5,293,581 | A | 3/1994 | DiMarco et al. |
| 5,477,451 | A | 12/1995 | Brown et al. |
| 5,510,981 | A | 4/1996 | Berger et al. |
| 5,799,193 | A | 8/1998 | Sherman et al. |
| 5,991,710 | A | 11/1999 | Papineni et al. |
| 6,002,998 | A | 12/1999 | Martino et al. |

(Continued)

OTHER PUBLICATIONS

Corrected Notice of Allowability dated Jul. 13, 2017, for U.S. Appl. No. 14/973,387 of Rottmann, K., et al., filed Dec. 17, 2015.

(Continued)

*Primary Examiner* — Leonard Saint Cyr (57) ABSTRACT

Technology for media item and user language classification is disclosed. Media item classification may use models for associating language identifiers or probability distributions for multiple languages with linguistic content. User language classification may define user language models for attributing to users indications of languages they speak read, and/or write. The text classifications and user classifications may interact because the probability that given text is in a particular language may depend on a determined likelihood the user who produced the text speaks that language, or conversely, a user interacting with text in a particular language may increase the likelihood they understand that language. Some embodiments use language-tagged social media content to train n-gram classifiers for use with other social media content.

13 Claims, 6 Drawing Sheets

(56) References Cited

U.S. PATENT DOCUMENTS

| | | |
|---|---|---|
| 6,125,362 A | 9/2000 | Elworthy |
| 6,157,905 A | 12/2000 | Powell |
| 6,161,082 A | 12/2000 | Goldberg |
| 6,223,150 B1 | 4/2001 | Duan et al. |
| 6,266,642 B1 | 7/2001 | Franz et al. |
| 6,304,841 B1 | 10/2001 | Berger et al. |
| 6,377,925 B1 | 4/2002 | Newman et al. |
| 6,393,389 B1 | 5/2002 | Chanod et al. |
| 6,629,095 B1 | 9/2003 | Wagstaff et al. |
| 7,054,804 B2 | 5/2006 | Gonzales et al. |
| 7,110,938 B1 | 9/2006 | Cheng et al. |
| 7,289,911 B1 | 10/2007 | Rigney et al. |
| 7,359,861 B2 | 4/2008 | Lee et al. |
| 7,533,019 B1 | 5/2009 | Riccardi et al. |
| 7,664,629 B2 | 2/2010 | Dymetman et al. |
| 7,813,918 B2 | 10/2010 | Muslea et al. |
| 7,827,026 B2 | 11/2010 | Brun et al. |
| 7,895,030 B2 | 2/2011 | Al-Onaizan et al. |
| 7,983,903 B2 | 7/2011 | Gao et al. |
| 8,015,140 B2 | 9/2011 | Kumar et al. |
| 8,145,484 B2 | 3/2012 | Zweig et al. |
| 8,175,244 B1 | 5/2012 | Frankel et al. |
| 8,204,739 B2 | 6/2012 | Lane et al. |
| 8,209,333 B2 | 6/2012 | Hubbard et al. |
| 8,265,923 B2 | 9/2012 | Chatterjee et al. |
| 8,275,602 B2 | 9/2012 | Curry et al. |
| 8,306,808 B2 | 11/2012 | Elbaz et al. |
| 8,386,235 B2 | 2/2013 | Duan et al. |
| 8,543,580 B2 | 9/2013 | Chen et al. |
| 8,756,050 B1 | 6/2014 | Curtis et al. |
| 8,825,466 B1 | 9/2014 | Wang et al. |
| 8,825,759 B1 | 9/2014 | Jackson et al. |
| 8,831,928 B2 | 9/2014 | Marcu et al. |
| 8,838,434 B1 | 9/2014 | Liu |
| 8,874,429 B1 | 10/2014 | Crosley et al. |
| 8,897,423 B2 | 11/2014 | Nanjundaswamy |
| 8,935,150 B2 | 1/2015 | Christ |
| 8,942,973 B2 | 1/2015 | Viswanathan |
| 8,949,865 B1 | 2/2015 | Murugesan et al. |
| 8,983,974 B1 | 3/2015 | Jackson et al. |
| 8,990,068 B2 | 3/2015 | Orsini et al. |
| 8,996,352 B2 | 3/2015 | Orsini et al. |
| 8,996,353 B2 | 3/2015 | Orsini et al. |
| 8,996,355 B2 | 3/2015 | Orsini et al. |
| 9,009,025 B1 | 4/2015 | Porter et al. |
| 9,031,829 B2 | 5/2015 | Leydon et al. |
| 9,104,661 B1 | 8/2015 | Evans |
| 9,183,309 B2 | 11/2015 | Gupta |
| 9,231,898 B2 | 1/2016 | Orsini et al. |
| 9,245,278 B2 | 1/2016 | Orsini et al. |
| 9,336,206 B1 | 5/2016 | Orsini et al. |
| 9,477,652 B2 | 10/2016 | Huang et al. |
| 9,734,142 B2 | 8/2017 | Huang |
| 9,734,143 B2 | 8/2017 | Rottmann et al. |
| 9,740,687 B2 | 8/2017 | Herdagdelen et al. |
| 9,747,283 B2 | 8/2017 | Rottmann et al. |
| 9,805,029 B2 | 10/2017 | Rottmann et al. |
| 9,830,386 B2 | 11/2017 | Huang et al. |
| 9,830,404 B2 | 11/2017 | Huang et al. |
| 9,864,744 B2 | 1/2018 | Eck et al. |
| 2002/0087301 A1 | 7/2002 | Jones et al. |
| 2002/0161579 A1 | 10/2002 | Saindon et al. |
| 2002/0169592 A1 | 11/2002 | Aityan |
| 2003/0040900 A1 | 2/2003 | D'Agostini et al. |
| 2003/0130846 A1 | 7/2003 | King et al. |
| 2004/0002848 A1 | 1/2004 | Zhou et al. |
| 2004/0049374 A1 | 3/2004 | Breslau et al. |
| 2004/0098247 A1 | 5/2004 | Moore |
| 2004/0122656 A1 | 6/2004 | Abir |
| 2004/0243392 A1 | 12/2004 | Chino et al. |
| 2005/0021323 A1 | 1/2005 | Li et al. |
| 2005/0055630 A1 | 3/2005 | Scanlan et al. |
| 2005/0228640 A1 | 10/2005 | Aue et al. |
| 2006/0111891 A1 | 5/2006 | Menezes et al. |
| 2006/0206798 A1 | 9/2006 | Kohlmeier et al. |
| 2006/0271352 A1 | 11/2006 | Nikitin et al. |
| 2007/0130563 A1 | 6/2007 | Elgazzar et al. |
| 2007/0136222 A1 | 6/2007 | Horvitz et al. |
| 2008/0046231 A1 | 2/2008 | Laden et al. |
| 2008/0077384 A1 | 3/2008 | Agapi et al. |
| 2008/0281578 A1 | 11/2008 | Kumaran et al. |
| 2009/0070095 A1 | 3/2009 | Gao et al. |
| 2009/0083023 A1 | 3/2009 | Foster et al. |
| 2009/0132233 A1 | 5/2009 | Etzioni et al. |
| 2009/0182547 A1 | 7/2009 | Niu et al. |
| 2009/0198487 A1 | 8/2009 | Wong et al. |
| 2009/0210214 A1 | 8/2009 | Qian et al. |
| 2009/0276206 A1 | 11/2009 | Fitzpatrick et al. |
| 2009/0281789 A1 | 11/2009 | Waibel et al. |
| 2009/0326912 A1 | 12/2009 | Ueffing et al. |
| 2010/0042928 A1 | 2/2010 | Rinearson et al. |
| 2010/0121639 A1 | 5/2010 | Zweig et al. |
| 2010/0161642 A1 | 6/2010 | Chen et al. |
| 2010/0179803 A1 | 7/2010 | Sawaf et al. |
| 2010/0194979 A1 | 8/2010 | Blumenschein et al. |
| 2010/0223048 A1 | 9/2010 | Lauder et al. |
| 2010/0228777 A1 | 9/2010 | Imig et al. |
| 2010/0241416 A1 | 9/2010 | Jiang et al. |
| 2010/0283829 A1 | 11/2010 | De Beer et al. |
| 2010/0299132 A1 | 11/2010 | Dolan et al. |
| 2010/0312769 A1 | 12/2010 | Bailey et al. |
| 2011/0099000 A1 | 4/2011 | Rai et al. |
| 2011/0137636 A1 | 6/2011 | Srihari et al. |
| 2011/0246172 A1 | 10/2011 | Liberman et al. |
| 2011/0246881 A1 | 10/2011 | Kushman et al. |
| 2011/0252027 A1 | 10/2011 | Chen et al. |
| 2011/0282648 A1 | 11/2011 | Sarikaya et al. |
| 2012/0005224 A1 | 1/2012 | Ahrens et al. |
| 2012/0029910 A1 | 2/2012 | Medlock et al. |
| 2012/0035907 A1 | 2/2012 | Lebeau et al. |
| 2012/0035915 A1 | 2/2012 | Kitade et al. |
| 2012/0047172 A1 | 2/2012 | Ponte et al. |
| 2012/0059653 A1 | 3/2012 | Adams et al. |
| 2012/0101804 A1 | 4/2012 | Roth et al. |
| 2012/0109649 A1 | 5/2012 | Talwar et al. |
| 2012/0123765 A1 | 5/2012 | Estelle et al. |
| 2012/0130940 A1 | 5/2012 | Gattani et al. |
| 2012/0138211 A1 | 6/2012 | Barger et al. |
| 2012/0158621 A1 | 6/2012 | Bennett et al. |
| 2012/0173224 A1 | 7/2012 | Anisimovich et al. |
| 2012/0209588 A1 | 8/2012 | Wu et al. |
| 2012/0253785 A1 | 10/2012 | Hamid et al. |
| 2012/0330643 A1 | 12/2012 | Frei et al. |
| 2013/0018650 A1 | 1/2013 | Moore et al. |
| 2013/0060769 A1 | 3/2013 | Pereg et al. |
| 2013/0084976 A1 | 4/2013 | Kumaran et al. |
| 2013/0103384 A1 | 4/2013 | Hunter et al. |
| 2013/0144595 A1 | 6/2013 | Lord et al. |
| 2013/0144603 A1 | 6/2013 | Lord et al. |
| 2013/0144619 A1 | 6/2013 | Lord et al. |
| 2013/0173247 A1 | 7/2013 | Hodson et al. |
| 2013/0246063 A1 | 9/2013 | Teller et al. |
| 2013/0317808 A1 | 11/2013 | Kruel et al. |
| 2014/0006003 A1 | 1/2014 | Soricut et al. |
| 2014/0006929 A1 | 1/2014 | Swartz et al. |
| 2014/0012568 A1 | 1/2014 | Caskey et al. |
| 2014/0025734 A1 | 1/2014 | Griffin et al. |
| 2014/0040371 A1 | 2/2014 | Gurevich et al. |
| 2014/0059030 A1 | 2/2014 | Hakkani-Tur et al. |
| 2014/0081619 A1 | 3/2014 | Solntseva et al. |
| 2014/0108393 A1 | 4/2014 | Angwin et al. |
| 2014/0163977 A1 | 6/2014 | Hoffmeister et al. |
| 2014/0172413 A1 | 6/2014 | Cvijetic et al. |
| 2014/0195884 A1 | 7/2014 | Castelli et al. |
| 2014/0207439 A1 | 7/2014 | Venkatapathy et al. |
| 2014/0229155 A1 | 8/2014 | Leydon et al. |
| 2014/0279996 A1 | 9/2014 | Teevan et al. |
| 2014/0280295 A1 | 9/2014 | Kurochkin et al. |
| 2014/0280592 A1 | 9/2014 | Zafarani et al. |
| 2014/0288913 A1 | 9/2014 | Shen et al. |
| 2014/0288917 A1 | 9/2014 | Orsini et al. |
| 2014/0288918 A1 | 9/2014 | Orsini et al. |
| 2014/0303960 A1 | 10/2014 | Orsini et al. |
| 2014/0335483 A1 | 11/2014 | Buryak et al. |

(56) References Cited

U.S. PATENT DOCUMENTS

| | | |
|---|---|---|
| 2014/0337007 A1 | 11/2014 | Fuegen et al. |
| 2014/0337989 A1 | 11/2014 | Bojja et al. |
| 2014/0350916 A1 | 11/2014 | Jagpal et al. |
| 2014/0358519 A1 | 12/2014 | Dymetman et al. |
| 2014/0365200 A1 | 12/2014 | Sagie |
| 2014/0365460 A1 | 12/2014 | Portnoy et al. |
| 2015/0006143 A1 | 1/2015 | Skiba et al. |
| 2015/0006148 A1 | 1/2015 | Najork et al. |
| 2015/0006219 A1 | 1/2015 | Jose et al. |
| 2015/0033116 A1 | 1/2015 | Severdia et al. |
| 2015/0046146 A1 | 2/2015 | Crosley et al. |
| 2015/0066805 A1 | 3/2015 | Taira et al. |
| 2015/0120290 A1 | 4/2015 | Shagalov |
| 2015/0134322 A1 | 5/2015 | Cuthbert et al. |
| 2015/0142420 A1 | 5/2015 | Sarikaya et al. |
| 2015/0161104 A1 | 6/2015 | Buryak et al. |
| 2015/0161110 A1 | 6/2015 | Salz |
| 2015/0161112 A1 | 6/2015 | Galvez et al. |
| 2015/0161114 A1 | 6/2015 | Buryak et al. |
| 2015/0161115 A1 | 6/2015 | Denero et al. |
| 2015/0161227 A1 | 6/2015 | Buryak et al. |
| 2015/0213008 A1 | 7/2015 | Orsini et al. |
| 2015/0228279 A1 | 8/2015 | Moreno et al. |
| 2015/0293997 A1 | 10/2015 | Smith et al. |
| 2015/0363388 A1 | 12/2015 | Green et al. |
| 2016/0041986 A1 | 2/2016 | Nguyen |
| 2016/0048505 A1 | 2/2016 | Tian et al. |
| 2016/0092603 A1 | 3/2016 | Rezaei et al. |
| 2016/0117628 A1 | 4/2016 | Brophy et al. |
| 2016/0162473 A1 | 6/2016 | Hedley et al. |
| 2016/0162477 A1 | 6/2016 | Orsini et al. |
| 2016/0162478 A1 | 6/2016 | Blassin et al. |
| 2016/0162575 A1 | 6/2016 | Eck et al. |
| 2016/0188575 A1 | 6/2016 | Sawaf |
| 2016/0188576 A1 | 6/2016 | Huang et al. |
| 2016/0188661 A1 | 6/2016 | Zhang et al. |
| 2016/0188703 A1 | 6/2016 | Zhang et al. |
| 2016/0217124 A1 | 7/2016 | Sarikaya et al. |
| 2016/0239476 A1 | 8/2016 | Huang et al. |
| 2016/0267073 A1 | 9/2016 | Noeman et al. |
| 2016/0299884 A1 | 10/2016 | Chioasca et al. |
| 2016/0357519 A1 | 12/2016 | Vargas et al. |
| 2017/0011739 A1 | 1/2017 | Huang et al. |
| 2017/0083504 A1 | 3/2017 | Huang |
| 2017/0169015 A1 | 6/2017 | Huang |
| 2017/0177564 A1 | 6/2017 | Rottmann et al. |
| 2017/0185583 A1 | 6/2017 | Pino et al. |
| 2017/0185586 A1 | 6/2017 | Rottmann |
| 2017/0185588 A1 | 6/2017 | Rottmann et al. |
| 2017/0270102 A1 | 9/2017 | Herdagdelen et al. |
| 2017/0315991 A1 | 11/2017 | Rottmann et al. |
| 2018/0004734 A1 | 1/2018 | Rottmann et al. |

OTHER PUBLICATIONS

Extended European Search Report for European Application No. 16161095.1, dated Feb. 16, 2017, 4 pages.
Final Office Action dated Jul. 1, 2016, for U.S. Appl. No. 14/302,032 of Herdagdelen, A., filed Jun. 11, 2014.
Final Office Action dated Jun. 16, 2017, for U.S. Appl. No. 14/586,022 of Huang, F. et al., filed Dec. 30, 2014.
International Search Report and Written Opinion for International Application No. PCT/US2015/051737, dated Jul. 28, 2016, 22 pages.
Koehn, P. et al., "Statistical Phrase-Based Translation," Proceedings of the 2003 Conference of the North American Chapter of the Association for computational Linguistics on Human Language Technology—vol. 1, Assoc. for Computational Linguistics, 2003, p.
Non-Final Office Action dated Dec. 17, 2015, for U.S. Appl. No. 14/302,032 of Saint Cyr, L., filed Jun. 11, 2014.
Non-Final Office Action dated Dec. 21, 2016, for U.S. Appl. No. 14/586,022 of Huang, F., filed Dec. 30, 2014.
Non-Final Office Action dated Dec. 29, 2016, for U.S. Appl. No. 14/586,049 of Huang, F. et al., filed Dec. 30, 2014.
Non-Final Office Action dated Dec. 30, 2016 in U.S. Appl. No. 14/586,074 by Huang, F. et al., filed Dec. 30, 2014.
Non-Final Office Action dated Feb. 9, 2017, for U.S. Appl. No. 14/559,540 of Eck, M. et al., filed Dec. 3, 2014.
Non-Final Office Action dated Jan. 12, 2017, for U.S. Appl. No. 15/275,235 of Huang, F. et al., filed Sep. 23, 2016.
Non-Final Office Action dated Jan. 19, 2017, for U.S. Appl. No. 14/980,654 of Pino, J. et al., filed Dec. 28, 2015.
Non-Final Office Action dated Jul. 28, 2016, for U.S. Appl. No. 14/861,747 of F. Huang, filed Sep. 22, 2015.
Non-Final Office Action dated Jun. 26, 2017 for U.S. Appl. No. 15/445,978 of Amac Herdagdelen, filed Feb. 28, 2017.
Non-Final Office Action dated Mar. 10, 2016, for U.S. Appl. No. 14/621,921 of Huang, F., filed Feb. 13, 2015.
Non-Final Office Action dated Nov. 9, 2016, for U.S. Appl. No. 14/973,387 by Rottmann, K., et al., filed Dec. 17, 2015.
Non-Final Office Action dated Oct. 6, 2016, U.S. Appl. No. 14/981,794 of Rottmann, K. filed Dec. 28, 2015.
Notice of Allowance dated Apr. 13, 2017, for U.S. Appl. No. 14/973,387 of Rottmann, K., et al., filed Dec. 17, 2015.
Notice of Allowance dated Apr. 19, 2017, for U.S. Appl. No. 14/981,769 by Rottmann, K., et al., filed Dec. 28, 2015.
Notice of Allowance dated Apr. 20, 2017 for U.S. Appl. No. 14/302,032 by Herdagdelen, A., et al., filed Jun. 11, 2014.
Notice of Allowance dated Apr. 7, 2017 for U.S. Appl. No. 14/861,747 by Huang, F., et al., filed Sep. 22, 2015.
Notice of Allowance dated Jul. 12, 2017, for U.S. Appl. No. 14/981,794 by Rottman, K., et al., filed Dec. 28, 2015.
Notice of Allowance dated Jul. 18, 2016, for U.S. Appl. No. 14/621,921 of Huang, F., filed Feb. 13, 2015.
Notice of Allowance dated Jun. 6, 2017, for U.S. Appl. No. 14/981,794 by Rottmann, K., et al., filed Dec. 28, 2015.
Notice of Allowance dated Mar. 1, 2017, for U.S. Appl. No. 14/981,769 by Rottmann, K., et al., filed Dec. 28, 2015.
Notice of Allowance dated Nov. 30, 2016, for U.S. Appl. No. 14/302,032 of Herdagdelen, A., filed Jun. 11, 2014.
Supplemental Notice of Allowability dated Jul. 13, 2017, for U.S. Appl. No. 14/981,769 by Rottmann, K., et al., filed Dec. 28, 2015.
Sutskever, I., et al., "Sequence to sequence learning with neural networks," Advances in Neural Information Processing Systems, pp. 3104-3112, 2014.
U.S. Appl. No. 14/302,032 of Herdagdelen, A et al., filed Jun. 11, 2014.
U.S. Appl. No. 14/559,540 of Eck, M et al., filed Dec. 3, 2014.
U.S. Appl. No. 14/586,022 of Huang, F. et al., filed Dec. 30, 2014.
U.S. Appl. No. 14/586,049, by Huang et al., filed Dec. 30, 2014.
U.S. Appl. No. 14/586,074 by Huang et al., filed Dec. 30, 2014.
U.S. Appl. No. 14/621,921 of Huang, F., filed Feb. 13, 2015.
U.S. Appl. No. 14/861,747 by Huang, F., filed Sep. 22, 2015.
U.S. Appl. No. 14/967,897 of Huang F. et al., filed Dec. 14, 2015.
U.S. Appl. No. 14/973,387, of Rottmann, K., et al., filed Dec. 17, 2015.
U.S. Appl. No. 14/980,654 of Pino, J. et al., filed Dec. 28, 2015.
U.S. Appl. No. 14/981,769 by Rottmann, K., et al., filed Dec. 28, 2015.
U.S. Appl. No. 14/981,794 by Rottmann, K., et al., filed Dec. 28, 2015.
U.S. Appl. No. 15/199,890 of Zhang, Y. et al., filed Jun. 30, 2016.
U.S. Appl. No. 15/244,179 of Zhang, Y., et al., filed Aug. 23, 2016.
U.S. Appl. No. 15/275,235 of Huang, F. et al., filed Sep. 23, 2016.
U.S. Appl. No. 15/422,463 of Merl, D., et al., filed Feb. 2, 2017.
U.S. Appl. No. 15/445,978 by Herdagdelen, A., et al., filed Feb. 28, 2017.
U.S. Appl. No. 15/644,690 of Huang, F. et al., filed Jul. 7, 2017.
Vogel, S. et al., "HMM-Based Word Alignment in Statistical Translation." In Proceedings of the 16th Conference on Computational Linguistics—vol. 2, Association for Computational Linguistics, 1996, pp. 836-841.
Zamora, J.D., et al., "Tweets language identification using feature weightings," Proceedings of the Twitter language identification workshop, Sep. 16, 2017, 5 pages.

(56) References Cited

OTHER PUBLICATIONS

U.S. Appl. No. 15/652,144 of Rottmann, K., filed Jul. 17, 2017.
U.S. Appl. No. 15/654,668 of Rottmann, K., filed Jul. 19, 2017.
Notice of Allowance dated Jul. 28, 2017, for U.S. Appl. No. 14/586,049 by Huang, F., et al., filed Dec. 30, 2014.
Notice of Allowance dated Jul. 26, 2017, for U.S. Appl. No. 14/586,074 by Huang, F., et al., filed Dec. 30, 2014.
Final Office Action dated Sep. 8, 2017 for U.S. Appl. No. 15/445,978 of Herdagdelen, A. filed Feb. 28, 2017.
Notice of Allowability dated Sep. 12, 2017 for U.S. Appl. No. 14/981,794 by Rottman, K., et al., filed Dec. 28, 2015.
Notice of Allowance dated Oct. 10, 2017 for U.S. Appl. No. 15/275,235 for Huang, F. et al., filed Sep. 23, 2016.
U.S. Appl. No. 15/672,690 of Huang, F., filed Aug. 9, 2017.
U.S. Appl. No. 15/696,121 of Rottmann, K. et al., filed Sep. 5, 2017.
Final Office Action dated Aug. 10, 2017 for U.S. Appl. No. 15/275,235 by Huang, F. et al. filed Sep. 23, 2016.
Final Office Action dated Aug. 25, 2017 for U.S. Appl. No. 14/980,654 by Pino, J. et al., filed Dec. 28, 2015.
Non-Final Office Action dated Aug. 29, 2017 for U.S. Appl. No. 14/967,897 by Huang, F., filed Dec. 14, 2015.
Notice of Allowance dated Aug. 30, 2017 for U.S. Appl. No. 14/559,540 by Eck, M. et al. filed Dec. 3, 2014.
Notice of Allowance dated Aug. 4, 2017, for U.S. Appl. No. 14/981,794 by Rottman, K., et al., filed Dec. 28, 2015.
Notice of Allowability dated Sep. 19, 2017 for U.S. Appl. No. 14/559,540 by Eck, M. et al. filed Dec. 3, 2014.
Notice of Allowance dated Oct. 23, 2017 for U.S. Appl. No. 15/445,978 of Herdagdelen, A. filed Feb. 28, 2017.
Taylor, S. et al. "Forecasting at Scale" Jan. 2017, retrieved from https://facebookincubator.github.io/prophet/static/prophet_paper_20170113.pdf. 1 page.
U.S. Appl. No. 15/723,095 of Tiwari, P. filed Oct. 2, 2017.
Corrected Notice of Allowability dated Nov. 17, 2017, for U.S. Appl. No. 14/559,540 of Eck, M. et al., filed Dec. 3, 2014.
Non-Final Office Action dated Nov. 14, 2017 for U.S. Appl. No. 15/422,463 by Merl, D. filed Feb. 2, 2017.
Corrected Notice of Allowability dated Dec. 12, 2017, for U.S. Appl. No. 14/559,540 of Eck, M. et al., filed Dec. 3, 2014.
U.S. Appl. No. 15/820,351 by Huang et al., filed Nov. 21, 2017.
U.S. Appl. No. 15/821,167 by Huang et al., filed Nov. 22, 2017.
U.S. Appl. No. 15/866,420 by Huang, F. filed Jan. 9, 2018.

CLASSIFYING LANGUAGES FOR OBJECTS AND ENTITIES

CROSS-REFERENCES TO RELATED APPLICATIONS

This application a continuation of U.S. patent application Ser. No. 15/445,978, filed on Feb. 28, 2017; which is a continuation of U.S. patent application Ser. No. 14/302,032, filed on Jun. 11, 2014; the disclosures of which are hereby incorporated herein in their entireties by reference.

BACKGROUND

The Internet has made it possible for people to connect and share information globally in ways previously undreamt of. Social media platforms, for example, have enabled people on opposite sides of the globe to collaborate on ideas, discuss current events, or just share what they had for lunch. In the past, this spectacular resource has been somewhat limited to a communication between users having a common natural language ("Language"). In addition, users have only been able to consume content that is in their language, or for which a content provider is able to determine an appropriate translation based on a system setting or a network location (e.g., an Internet Protocol ("IP") address).

While communication across the many different languages used around the world remains a particular challenge, machine translation services have attempted to address this concern. These services provide mechanisms for a user to provide a text using a web form, select one or more languages, and receive a translation of the text in a selected language. While these services have significantly increased people's ability to communicate across language barriers, they can require users to open a separate website, indicate the language they want the translation in, and even identify the language of the source document. The resulting translation is then shown in that separate website, which removes the content from the context provided by the original source. In some cases the translator service may not be able to locate portions of the source page to translate or may provide an unreadable version of the source website due to formatting changes resulting from the translation. In many cases, users find this process too cumbersome and may lose patience and navigate to a different website or may simply skip over text they do not understand, missing an opportunity to receive content. In addition, content providers may not be able to provide comprehensible media items to users if language classification identifiers, e.g., IP address and browser settings are not true indications of a user's preferred language.

DETAILED DESCRIPTION

A language clarification technology for generating and implementing user language models and media language classifiers is disclosed. User language models may provide an indication, associated with a user, that the user is facile with one or more languages. Language media classifiers may provide, for a particular media item, an indication of the language the media item is in. A media item, as used herein, may be any content that utilizes a language, including text, audio, video, etc. A language, as used herein, is a natural language, which is a human written, spoken, or signed language, e.g., English, French, Chinese, or American Sign Language. A language need not be a national language, e.g., English, but may be a dialect of or variation on a particular natural language or may be a separate representation of a language, e.g., Pinyin. A user's facility with any particular language may relate to that user's ability to speak/understand, read, and/or write the language. A stored indication that a user is facile with a language may comprise one or more identifiers for any combination of speaking, reading, or writing the language.

In some embodiments, user language models and media language classifiers may be incorporated into Internet systems to provide improved translation automation. For example, a social media platform may employ user language models to associate a user profile with one or more languages the associated user is facile with. This may enable the social media platform to provide automatic translations of media items into a language known by a viewing user. This may also help indicate the language of a media item a current user creates or interacts with. As another example, a social media platform may use media language classifiers to assign language identifiers to media items, e.g., media items created by the user. This may enable designation of a language the media item will be translated from. This may also facilitate attributing language abilities to users who create and consume the media items. Additionally, this enables a server to modify or select other items within a web page to match the language of a classified media item. Furthermore, identified media items may be used as training data to build additional classifiers.

User language models may store data objects indicating language facility as probabilities, Boolean operators for individual languages, or probability distributions across multiple languages. User language models may contain a single field indicating that a user is facile with a language or languages, or may have multiple fields indicating one or more of the user's facility to read, write, speak and/or understand a language. User language models may be based on a combination of statistical observations for characteristics associated with a user and adjustment factors based on actions taken by the user. A user may be initially assigned a baseline likelihood that the user is facile with a particular language based on characteristics known about the user. The baseline likelihood may then be updated as actions taken by the user are observed or new characteristics of the user are learned. For example, a user may have various known language-implicating characteristics: a locale associated with their IP address; membership with a particular social media platform; association as friends with particular other user profiles; Internet browser's locale; country of residence; etc. As used herein, a friend or friend account is another user account that has been identified and associated with a user's account, as is common in social media and other similar contexts. In this example, an initial baseline likelihood may be created by combining the observations that 70% of the users in the user's IP locale speak Spanish, that users of the social media platform are 60% likely to speak English, and that 75% of the user accounts associated to the user's account as friends have language models indicating those friends are Spanish speakers. Each of these identified characteristics may have an associated weight used in the combination. In this example, the weighted combination may provide a 73% baseline likelihood that the user is facile with Spanish and a 40% baseline likelihood the user is facile with English. In some embodiments, the baseline likelihood may be split into sub-abilities, e.g., a 78% likelihood the user reads/writes Spanish and a 72% likelihood the user can speak Spanish. As actions performed by the user are observed, the baseline likelihood may be updated with language expectation valued specified for the observed actions.

Continuing the example, the system may identify actions indicating that half the media items the user creates are in German and the other half are in Spanish; that more than half the time user selects a media item, it is a media item classified as German; and that on numerous occasions the user has used a translation service to translate English content into German. Observed actions may have a weight specified for use in a computation for updating either a baseline or current prediction. The weights may be dependent on an observed intensity or frequency of the action. In this example, the baseline likelihoods may be updated such that the probability the user is facile with Spanish is increased to 88% because it is likely a user is able to use Spanish if they are creating Spanish media items. The baseline likelihoods may be further updated to change a 0%, or other default likelihood, that the user is facile with German to 95% based on the user creating German media items, interacting with German media items, and translating media items into German. Finally, the baseline likelihoods may be changed to indicate that it is only 5% likely that the user is facile with English, based on the user translating media items from English. In some embodiments, translating to or from a language may have a particularly heavy weight. Building user language models are discussed in more detail below in relation to FIG. 4.

The language classification technology may also be used to classify media items as being in a language. Media item classification may use any combination of classifiers including context classifiers, dictionary classifiers, and trained n-gram analysis classifiers. Context classifiers may use context characteristics associated with a media item to provide a probability that the media item is in a particular language. The context characteristics may comprise information about the media item's source, information about the media item's use, or characteristics of users who interact with the media item. A context characteristic may correspond to a computed likelihood that a media item with this context characteristic is in a particular language.

Dictionary classifiers may review particular words of a media item to decide what language the use of that word indicates. Particular words in a media item may correspond to a specified probability that the media item is in a particular language. For example, a post to a social media platform may include the words "fire" and "banana." There may be a 65% probability that a media item with the word "fire" is in English and a 40% probability a media item with the word "banana" is in English. The system may use a specified algorithm, for example an algorithm that takes the average of the attributed probabilities, to compute a 52% probability that the media item is in English based on the dictionary classification.

Trained classifiers may use n-gram analysis to compare groupings of characters, or n-grams, from a media item to a probability distribution showing, given the use of the n-gram, whether a corresponding media item is in a particular language. The probability distributions for a trained classifier may be generated using a training process that analyzes a body of multiple training media items, where each training media item has a language classification. In the training process, one or more n-grams within the media items of a particular length, e.g., four or five characters, may be analyzed to determine a frequency with which that n-gram appears across the various languages of the training media items. In some embodiments, trained classifiers may be trained for use with particular types or categories of media items. Category based training may provide more accurate classifications because the way language is used in the training data, e.g., language tagged pages from Wikipedia, may provide probability distributions inconsistent with the way that same language is used in other contexts, e.g., on a social media platform. For example, an n-gram, e.g. "she said," may show up regularly during person-to-person communication on a social media platform may be very infrequent in an informational source e.g., Wikipedia. Therefore, a trained classifier trained on a Wikipedia data source, when presented with the "she said" n-gram, may provide a distribution for English that is too low.

Building user language models and classifying media items may be interrelated processes because the probability that a given media item is in a particular language may depend on a likelihood the user who produced the media item speaks that language, or conversely observing a user interacting with a media item in a particular language may increase the likelihood the user understands that language. For each context characteristic used to improve a language classification of a media item, subsequent observations of users interacting with that media item are also improved. Likewise, for each action observed for a user to improve that user language model, subsequent media items created by that user are more likely to have a correct language classification based on that language model. Accordingly, this feedback loop between the media item classification process and the language modeling process enables each to be enhanced by characteristics and actions observed in the other process.

Figure 1:
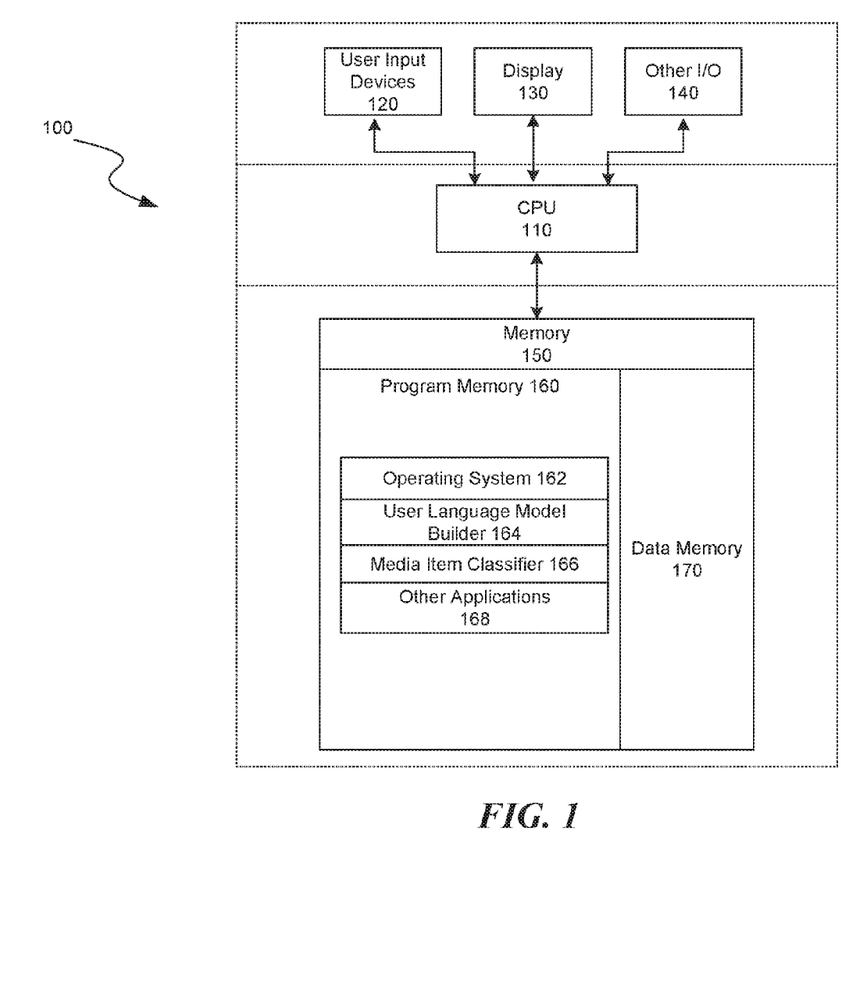
FIG. 1 is a block diagram illustrating an overview of devices on which some embodiments of the language classification technology may operate.

Several embodiments of the language classification technology are discussed below in more detail in reference to the Figures. Turning now to the Figures, FIG. 1 is a block diagram illustrating an overview of devices 100 on which some embodiments of the language classification technology may operate. The devices may comprise hardware components of a device 100 for implementing a user and media item language classification system. Device 100 includes one or more user input devices 120 that provide input to the CPU (processor) 110, notifying it of actions performed by a user. The actions are typically mediated by a hardware controller that interprets the signals received from the input device and communicates the information to the CPU 110 using a known communication protocol. Input devices 120 include, for example, a mouse, a keyboard, a touchscreen, an infrared sensor, a touchpad, wearable input devices, a camera or image-based input device, a microphone, or other user input devices.

CPU 110 may be a single processing unit or multiple processing units in a device or distributed across multiple devices. As used herein, a processor, e.g., CPU 110, may be a single processing unit or multiple processing units in a device or distributed across multiple devices. CPU 110 may be coupled to other hardware devices, for example, with the use of a BUS, e.g., a PCI BUS or SCSI BUS. The CPU 110 may communicate with a hardware controller for devices, e.g., for a display 130. Display 130 may be used to display text and graphics. One example of a display 130 is a touchscreen that provides graphical and textual visual feedback to a user. In some implementations, the display includes the input device as part of the display, e.g., when the input device is a touchscreen. In some implementations, the display is separate from the input device. Examples of standalone display devices are: an LCD display screen, an LED display screen, a projected display (such as a heads-up display device), and so on. Other I/O devices 140 may also be coupled to the processor, e.g., a video or audio card, USB or other external devices, printer, speakers, CD-ROM drive, DVD drive, disk drives, or Blu-Ray devices. In some implementations, other I/O devices 140 also include a communication device capable of communicating wirelessly or wire-based with a network node. The communication device may communicate with another device or a server through a network using, for example, TCP/IP protocols. For example, device 100 may utilize the communication device to distribute operations across multiple network devices.

The CPU 110 has access to a memory 150. A memory includes one or more of various hardware devices for volatile and non-volatile storage, and may include both read-only and writable memory. For example, a memory may comprise random access memory (RAM), read-only memory (ROM), writable non-volatile memory, e.g., flash memory, hard drives, floppy disks, CDs, DVDs, magnetic storage devices, tape drives, device buffers, and so forth. A memory is not a propagating electrical signal divorced from underlying hardware, and is thus non-transitory. The memory 150 includes program memory 160 that contains programs and software, such as an operating system 162, user language model builder 164, media item classifier 166, and any other application programs 168. The memory 150 also includes data memory 170 that includes any configuration data, settings, user options and preferences that may be needed by the program memory 160 or by any element of the device 100.

The language classification technology is operational with numerous other general purpose or special purpose computing system environments or configurations. Examples of well-known computing systems, environments, and/or configurations that may be suitable for use with the technology include, but are not limited to, personal computers, server computers, handheld or laptop devices, cellular telephones, tablet devices, e-readers, multiprocessor systems, microprocessor-based systems, set-top boxes, programmable consumer electronics, network PCs, minicomputers, mainframe computers, distributed computing environments that include any of the above systems or devices, and the like.

Figure 2:
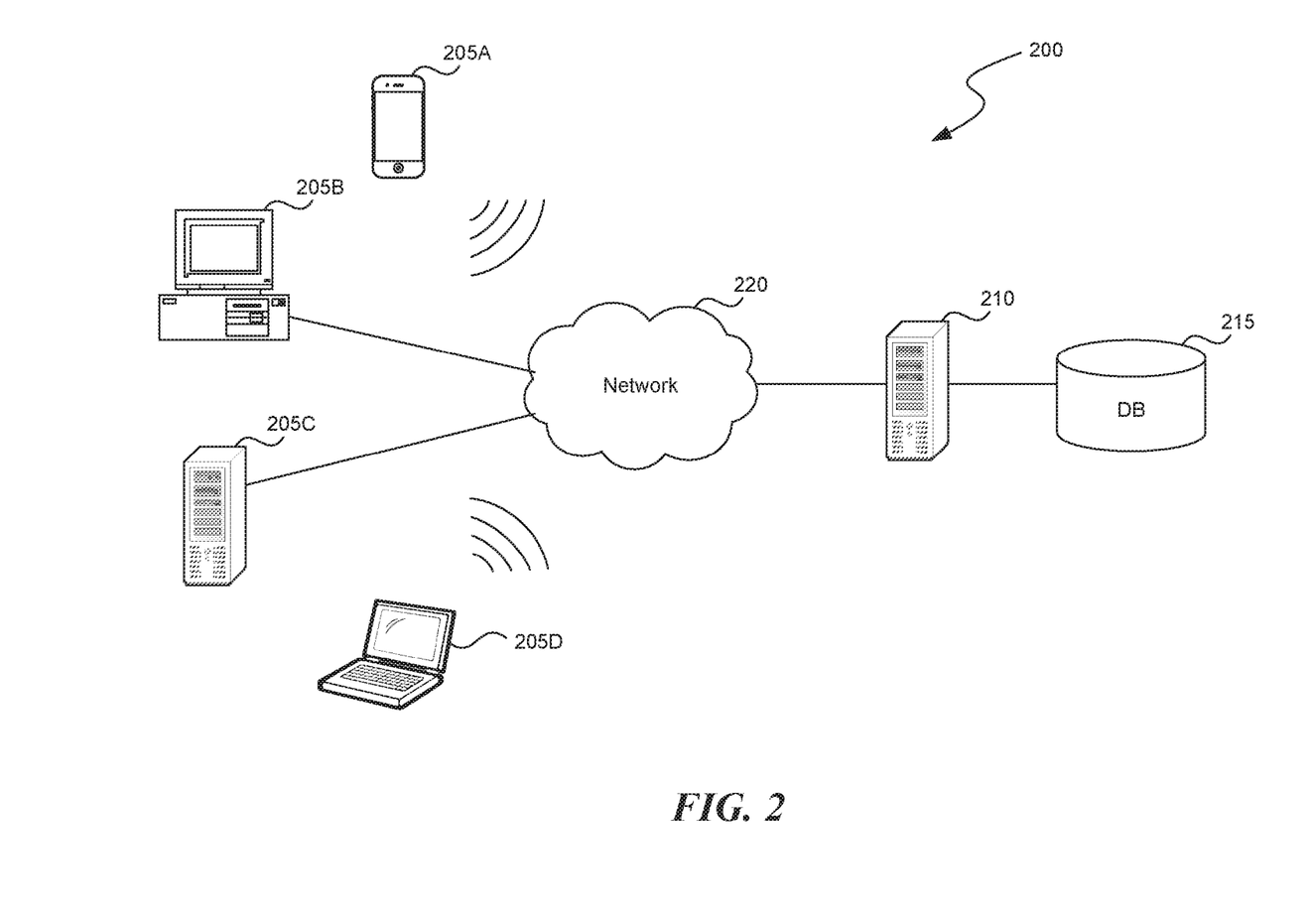
FIG. 2 is a block diagram illustrating an overview of an environment in which some embodiments of the language classification technology may operate.

FIG. 2 is a block diagram illustrating an overview of an environment 200 in which some embodiments of the language classification technology may operate. An environment for implementing the technology may include client computing devices 205, illustrated here as client computing devices 205A-D, an example of which may include device 100. Client computing devices 205 may operate in a networked environment using logical connections to one or more remote computers such as server computing device 210 through network 220. Client computing devices 205 and server computing device 210 may each act as a server or client to other server/client devices. Server 210 may connect to a database 215. Database 215 may warehouse information, e.g., user profile and preference information including language models, friend associations, links between users and content they create or access, user translation history, media items, media item classifications, classification training data, and language classifiers.

Network 220 can be a local area network (LAN) or a wide area network (WAN), but may also be other wired or wireless networks. The client computing devices 205 can be connected to network 220 through a network interface, e.g., by a wired or wireless network.

Figure 3:
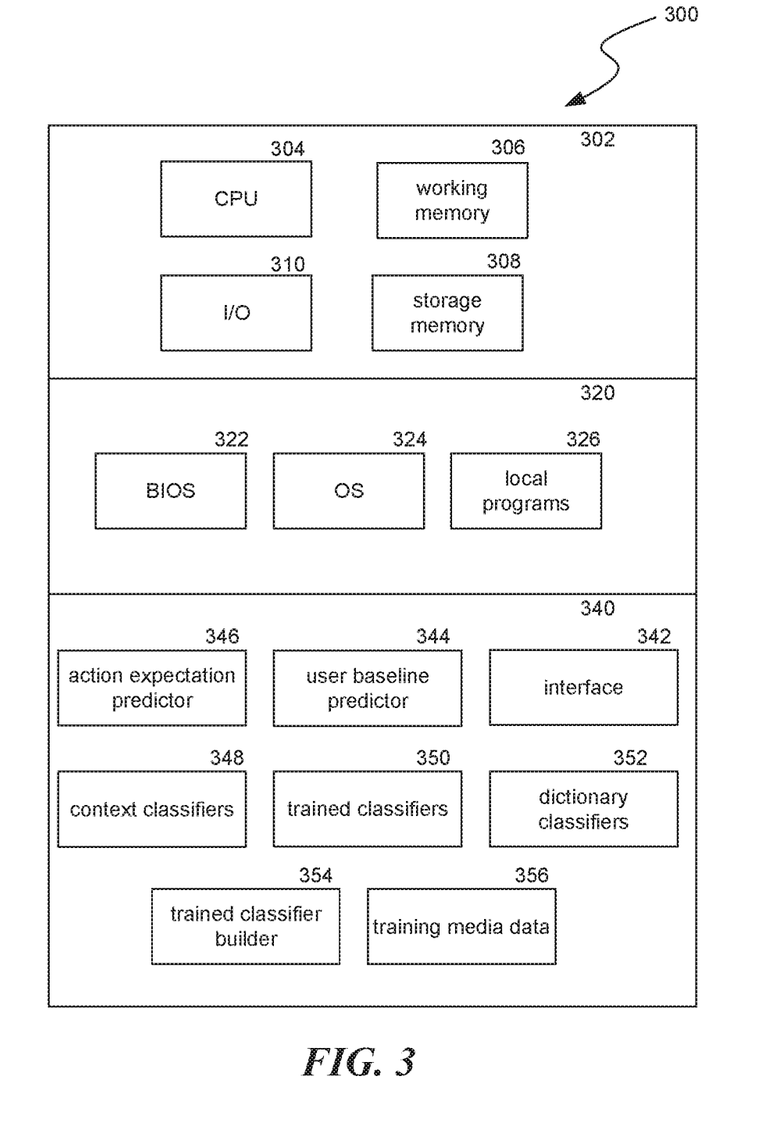
FIG. 3 is a block diagram illustrating components which, in some embodiments, may be used in a system implementing the language classification technology.

FIG. 3 is a block diagram illustrating components 300 which, in some embodiments, may be used in a system implementing the language classification technology. The components 300 include hardware 302, general software 320, and specialized components 340. As discussed above, a system implementing the language classification technology may use various hardware including a central processing unit 304, working memory 306, storage memory 308, and input and output devices 310. Components 300 may be implemented in a client computing device such as client computing devices 205 or on a server computing device, e.g., server computing device 210.

General software 320 may include various applications including a BIOS 322, an operating system 324, and local programs 326. Specialized components 340 may be subcomponents of a general software application 320, e.g., a local program 326, or may be invoked as remote processes. Specialized components 340 may include interface 342, user baseline predictor 344, action expectation predictor 346, context classifiers 348, trained classifiers 350, dictionary classifiers 352, trained classifier builder 354, and training media data 356.

In some embodiments, a system may request creation of a user language model. In response, interface 342 may receive an identification of user characteristics or user actions. Received user characteristics may be associated with corresponding likelihoods that users with that particular characteristic are facile with a particular language. Received user actions may be associated with corresponding values indicating an expectation that users who perform that particular action are facile with a particular language. Received user characteristics and associated likelihoods may be passed to user baseline predictor 344, which may combine the specified likelihoods into one or more baseline likelihoods that, based on the received characteristics, the user is facile with one or more languages. Received user actions and associated values, as well as the baseline likelihood, may be passed to action expectation predictor 346, which may use the specified expectation value to update the baseline likelihood to generate a current prediction. The current prediction may undergo further updating as the system learns additional characteristics about the user or learns of additional actions taken by the user. The baseline likelihood and current prediction may be probability values for a single language, distributions across multiple languages, or may each comprise one or more binary indicators for particular languages the system predicts the user is facile with. The baseline likelihood and current prediction may also be broken down into sub-categories of being facile with a language, where the sub-categories may include any of being able to read a language, being able to write the language, being able to speak the language, being able to understand the language when spoken, or any combinations thereof. In some embodiments, the current prediction may also include, based on the identified user characteristics and observed actions, a likely location of the user. The current prediction may be used as a language model for a user associated with the identified user characteristics and observed actions. Generation of user language models is discussed in more detail below in relation to FIG. 4.

In some embodiments a system may request language classification of a media item. In response, interface 342 may receive indications of the context of the media item and words or character groupings from the media item. Each received context may be associated with a corresponding computed likelihood that a media item with this context is in a particular language. Received media item contexts and associated likelihoods may be passed to context classifiers 348. In some embodiments, the observed contexts of the media item are passed to the context classifiers 348, and context classifiers 348 retrieve or compute associated likelihoods. In some embodiments, an indication of the media item is passed to the context classifiers 348. Context classifiers 348 may identify contexts of the media item that are relevant to language prediction, or that occur frequently enough or with sufficient intensity to meet a threshold level sufficient to be predictive of a language of the media item. Context classifiers 348 may combine the specified likelihoods into one or more context predictions that, based on the contexts, predict a particular language for the media item.

Trained classifiers 350 may receive words or character groupings from the media item. Trained classifiers 350 may select one or more n-grams, using a specified n-gram length, from the media item words or character groupings. Using defined probabilities for the selected n-grams, the trained classifiers may generate a trained prediction that the media item is in a particular language, given the selected n-grams.

Dictionary classifiers 352 may receive words from the media item and may determine that one or more of the words are indicative, to a particular degree, of a particular language. Using the particular degrees of indication corresponding to the one or more words, the dictionary classifiers 352 may compute a dictionary prediction that the media item is in a particular language. Any one or any combination of a context prediction, a trained prediction, and a dictionary prediction may be used to assign a language classification to the media item. Each of the context prediction, the trained prediction, the dictionary prediction and the assigned language classification may comprise one or more language probabilities, Boolean operators for individual languages, or distributions across multiple languages. Classification of media items is discussed in more detail below in relation to FIG. 5.

In some embodiments interface 342 may receive a request for creation of one or more trained classifiers. In response, trained classifier builder 354 may retrieve, from training media data 356, training media items. In some embodiments, trained classifier builder 354 may generate trained classifiers corresponding to a particular category of media items. One category for building trained classifiers may be for social media. When trained classifier builder 354 builds a social media trained classifier, each training media item retrieved from training media data 356 is gathered from a social media source and has an associated language identifier based on one or more of: a language model associated with a user who created the media item, a common identified language in both a language model associated with a user who created the media item and in a language model associated with a user who received the media item, and context characteristics regarding the source or use of the media item within a social media source. Training classifier builder 354 selects multiple n-grams of a specified length and computes, for each selected n-gram, a probability distribution that a particular media item is in a particular language given that the n-gram is in the particular media item. Each probability distribution may be based on an analysis of the frequency of that n-gram in a subset of the training media items defined by each media item in the subset having the same language identifier. Training classifier building is discussed in more detail below in relation to FIG. 6.

Those skilled in the art will appreciate that the components illustrated in FIGS. 1-3 described above, and in each of the flow diagrams discussed below, may be altered in a variety of ways. For example, the order of the logic may be rearranged, substeps may be performed in parallel, illustrated logic may be omitted, other logic may be included, etc. Some processes described below may use recursive algorithms. Those skilled in the art will further appreciate that equivalent implementations may be created with or without recursion.

Figure 4:
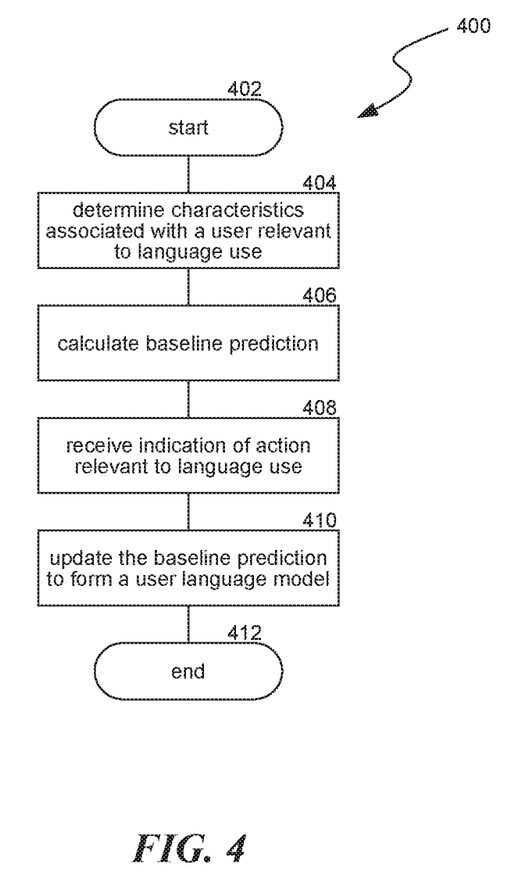
FIG. 4 is a flow diagram illustrating a process used in some embodiments for creating a user language model.

FIG. 4 is a flow diagram illustrating a process 400 used in some embodiments for creating a user language model. The process begins at block 402 then continues to block 404. At block 404, the process identifies characteristics of a user that are indicative of the user's language usage. For example, characteristics may include one or more of: the user's IP address, browser settings, language or location associated with friend accounts, operating system settings, and user specified account settings. In some embodiments, the characteristics are provided to the system as specified features associated with a user. In some embodiments, the process accesses information associated with the user, e.g., settings in their profile, friend data, browser settings, operating system settings, IP address, and previously saved data such as cookies to determine whether any portion of this accessible data matches a characteristic for which a language likelihood is known or can be calculated. In some embodiments, determining whether a likelihood is associated with characteristics identified in accessible data comprises determining whether one or more of the characteristics meet a threshold intensity or frequency sufficient to provide a reliable language predictor. For example, a system could conclude that at least 80% of the friend user accounts associated with a particular user profile have an identification as Dutch speakers, however, the system may only attribute this as a predictive characteristic once the particular user account is associated with at least six friend accounts.

The process then continues to block 406, where it computes a baseline prediction that the user is facile with one or more languages. The computation of the baseline prediction may be based on the characteristics identified in block 404. In some embodiments, characteristics identified in block 404 may be associated with a particular likelihood. In some embodiments, a likelihood value is not pre-assigned to some of the characteristics identified in block 404, and therefore likelihoods for these characteristics are computed as part of block 406. For example, an algorithm may determine that, based on current census data, an IP address for Mexico City provides an 88% likelihood that a user speaks Spanish. Likelihoods associated with characteristics may vary according to the characteristic value. For example, an IP address indicating a user lives in Vermont may be a strong language predictor, while an IP address indicating a user lives in southern California may be only a moderate language predictor.

In some embodiments, the baseline prediction may be a probability distribution curve. For example, block 406 may create a probability distribution indicating a confidence level that a user is facile with a language where the height and shape of the curve are based on a combination of the likelihoods associated with each characteristic identified in block 404. In other embodiments, the baseline prediction for a language may be a single value based on a combination of the likelihoods associated with each characteristic identified in block 404. In some embodiments, the identified characteristics may have associated weights indicating how reliable a predictor the characteristic is based on an intensity or frequency of the characteristic. For example, user profile with 20% of its associated friend profiles having a German language indicator may provide a 27% likelihood the user associated with the profile is facile with German, while a user profile with 85% of its associated friend profiles having a Italian language indicator may provide a 92% likelihood the user associated with the profile is facile with Italian. In some embodiments, characteristics may have likelihoods of a set value and/or no corresponding weight. For example, whether there is a browser setting indicating a French preference is a binary question that, if true, may be indicated by a system administrator to provide a 60% likelihood that the corresponding user is facile with French.

The process then continues to block 408 where it receives one or more indications of actions taken by the user indicative of a language facility. For example, actions indicating a language facility may include one or more of: composing content in an identified language, accessing or interacting with content in an identified language, translating a content item to a particular language, and translating a content item from a particular language. In some embodiments, indications of actions may be actions taken by other users. For example, if 100 users whose user profiles indicate they speak only Swahili access content created by a particular user, these actions may indicate that the user created a Swahili content item, increasing the probability the user is facile with Swahili. Once actions are identified, the process continues to block 410.

At block 410, the process uses expectation values associated with the actions indicated in block 408 to update the baseline prediction. Similarly to the user characteristics, actions indicated in block 408 may have specified expectation values or the process at block 410 may calculate expectation values dynamically. Actions may have an associated weight based on intensity or frequency of the action. In some embodiments, the updating may be repeated over multiple user language model updates as additional actions and/or user characteristics are observed. Some actions may decrease a prediction value indicating that a user is facile with a particular language. For example, a baseline likelihood may establish that a user is 60% likely to be facile with Vietnamese, but then on multiple occasions the user is observed translating content out of Vietnamese. In this example, the computed probability that the user is facile with Vietnamese may be decreased to 15% based on the translation activity. Process then proceeds to block 412, where it ends.

Process 400 may result in a language model comprising a value, a probability distribution, or any other data organization configured to indicate a probability a user is facile with a language. In addition, process 400 may create a language model for a single language, or may create a distribution across multiple languages. As discussed above, process 400 in some embodiments may result in a language model with a separate prediction for a user's facility to read versus their facility to write a language. In some embodiments, some context characteristics or observed actions may be associated with a first likelihood that a user is able to read a language and a different likelihood that a user is able to write a language. For example, an observed action of a user translating a content item to Italian may provide a 60% chance that the user can read Italian, but only a 40% chance the user can write in Italian.

Figure 5:
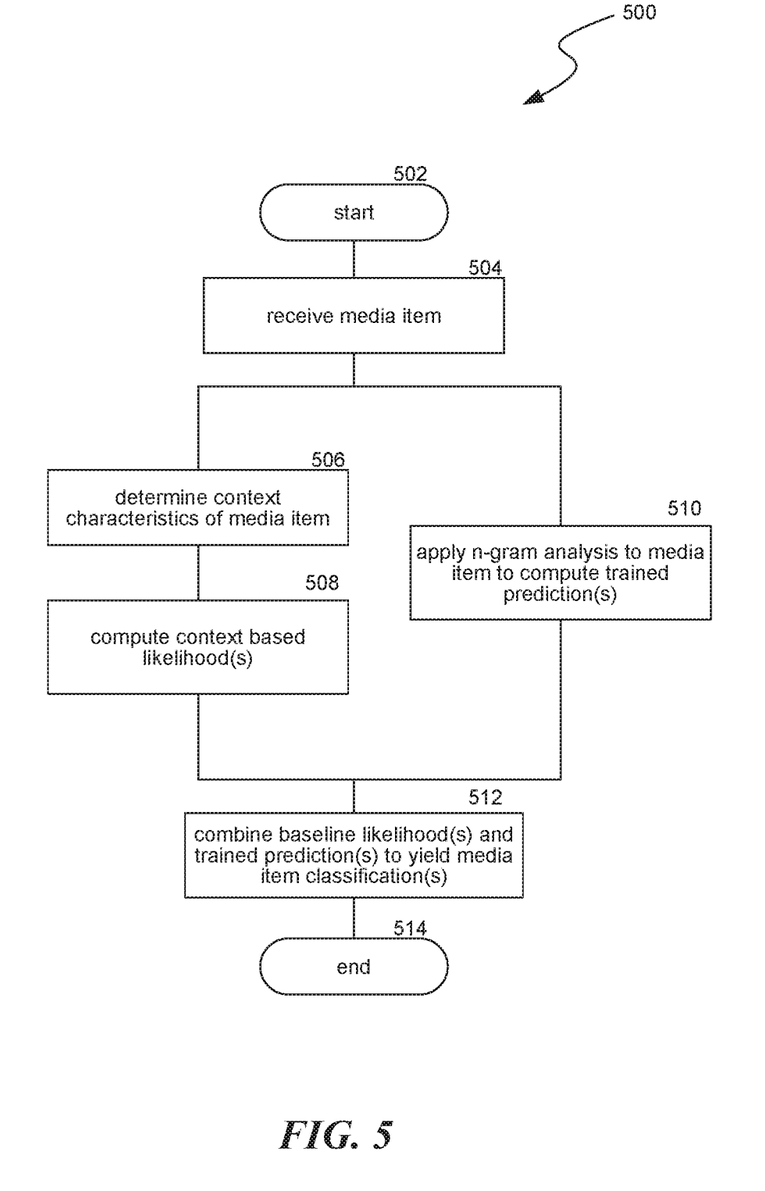
FIG. 5 is a flow diagram illustrating a process used in some embodiments for creating a language classification for a media item.

FIG. 5 is a flow diagram illustrating a process 500 used in some embodiments for creating a language classification for a media item. The process starts at block 502 and continues to block 504. At block 504, the process receives a media item to be classified including a linguistic element, e.g., text, audio, or video. The process then continues to block 506 and/or 510.

At block 506, the process identifies a set of one or more context characteristics. A context characteristic may be any data, apart from the content of the media item, which indicates the media item is in a particular language. For example, a context characteristic may include information about the media item's source, information about the media item's use, or characteristics of users who interact with the media item. The process then continues to block 508.

At block 508, the process computes a likelihood that the media item is in a particular language. Each context characteristic identified in block 506 may have an associated likelihood value or a likelihood value may be generated dynamically at block 508. For example, if the language model for a user that originated a media item indicates the user is only facile with English, this context characteristic may provide a 65% likelihood that the media item is in English. As another example, block 508 may perform an analysis of all the users that have interacted with a media item. If a threshold amount, e.g. 75%, of the interacting users are facile with multiple languages including a first particular language, the process may compute a 60% likelihood the media item is in that first language. However, if 20% of the users who interact with the media item only speak a second different language, the likelihood for this context characteristic may be calculated as only 40% likely for each of the first and second languages.

At block 510, the process applies trained n-gram analysis to the media item. Trained n-gram analysis selects groupings of characters (n-grams) from a text version of the language portion of the media item, and compares the n-grams to a specified probability distribution from a trained language classifier. The trained language classifier identifies, for a given n-gram, a probability that the n-gram is from a particular language based on that n-gram's frequency in a set of training data for that language. Trained language classifiers are discussed in more detail below in relation to FIG. 6. A language prediction for the media item may then be obtained based on the frequency of that n-gram in the language, as estimated by the n-gram analysis language classifier. In some embodiments, the identified prediction obtained by an n-gram analysis is based on a computation using the results of multiple selected n-grams from a media item or from a selection of particular n-grams. The particular n-grams may include the most common n-grams in the media item or one or more n-grams identified as being reliable predictors. The process then continues to block 512.

At block 512, the computed context likelihood and the results of the n-gram analysis are combined. In some embodiments only one of these results may be computed, in which case the language classification for the media item may be based on only one of the context likelihood and the results of the n-gram analysis. The combination may be accomplished in various ways, e.g., averaging the classification result values or distributions or using weighting by confidence factors. Confidence factors may include the number of found context characteristics or matched n-grams or making a determination that particular context characteristics or matched n-grams are very reliable predictors.

In some embodiments, other or alternate predictions, e.g. a dictionary prediction, may also be combined in block 512. A dictionary prediction selects words from a media item and provides a language prediction of the media item based on an identified frequency of words in a language. In some embodiments that implement a dictionary prediction, only particular words that are specifically predictive are selected to make a language prediction for the media item.

The combination or selection of a prediction becomes a language classification for the media item. This classification may be in the form of a value like "Chinese" or a probability distribution across multiple languages. The language classification may be associated with a confidence factor and be part of a data structure that provides access to the context characteristics and/or matched n-grams that were used to generate the classification. The language classification is then stored. The process then continues to block 514, where it ends.

Figure 6:
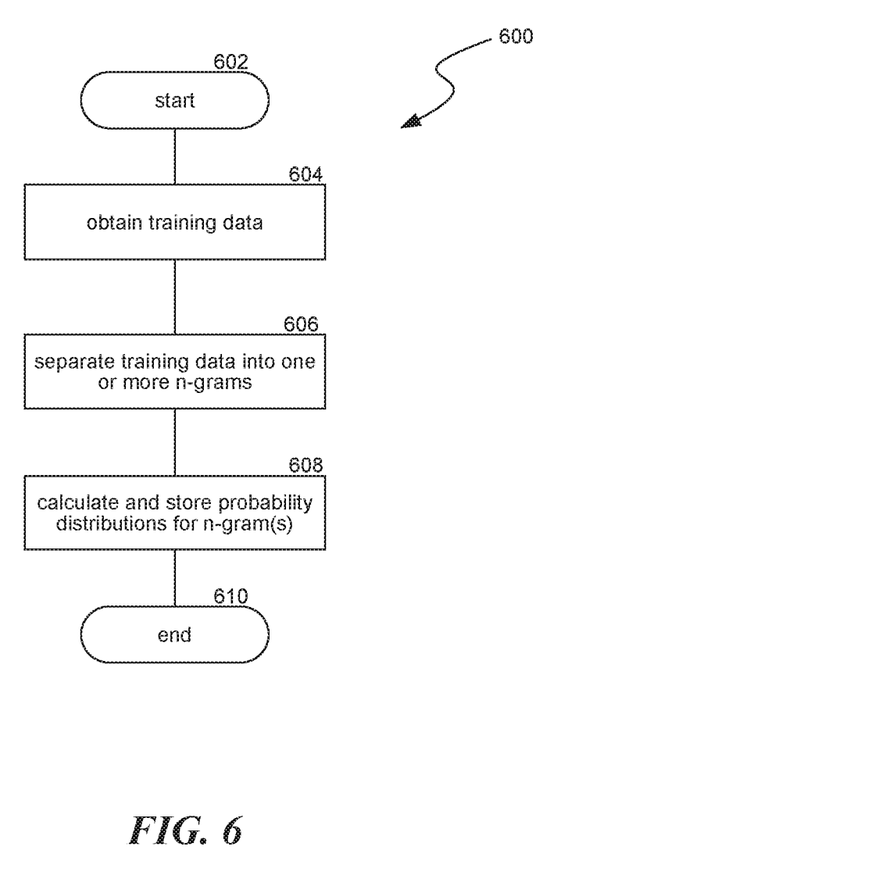
FIG. 6 is a flow diagram illustrating a process used in some embodiments for generating an n-gram analysis language classifier.

FIG. 6 is a flow diagram illustrating a process 600 used in some embodiments for generating a trained n-gram analysis language classifier. A trained classifier defines a probability distribution for one or more n-grams indicating that a media item that uses the n-gram is in a particular language. For example, an n-gram analysis language classifier may include an "ello" n-gram entry that indicates a media item that contains the "ello" n-gram is 40% likely to be in English, 15% likely to be in Spanish, and 3% likely to be in German. A trained classifier may be created by analyzing the frequency of n-grams in a body of training media items.

Process 600 begins at block 602 and continues to block 604. At block 604, the process obtains training data. Trained classifiers may be trained for use with particular types of media items by selecting training data comprising media items from a source consistent with that type of media item. For example, trained classifiers may be created to classify social media content items by training the classifier using social media content items that already have a language classification. In some embodiments, the training data may be selected such that each training media item in the training data is selected using a social media source and each selected training media item was classified as being in a particular language based on A) a language model of a user who created the media item that indicating the user is mono-linguistic, B) there being a common identified language in both a language model associated with a user who created the media item and in a language model associated with a user who received the media item, or C) a group or page to which the media item was added is in a single known language. The process then continues to block 606.

At block 606, the process selects one or more n-grams of a set length from the training data. The set length may vary between trained classifiers of the system. In some embodiments the n-gram length is four or five characters. In some embodiments, all possible character sequences of the set length in the training data are selected as n-grams. The process then continues to block 608.

At block 608, a probability distribution is computed for each n-gram selected in block 606. Each probability distribution may show a rate at which that n-gram appears across the languages of the training media items. The value corresponding to each language in the probability distribution for an n-gram may be based on an analysis of the frequency that the n-gram appears in the training media items of that language. The resulting distribution for an n-gram indicates, when that n-gram appears in a media item, the likelihood for each language that the source media item is in that language. In some embodiments the probability distribution may be a single value for a single language. For example, the distribution that the use of the "erci" n-gram provides a 60% probability the media item containing the n-gram is in French. The generated probability distribution is saved as part of the trained classifier. The process then continues to block 610, where it ends.

Several embodiments of the described technology are described above in reference to the Figures. The computing devices on which the described technology may be implemented may include one or more central processing units, memory, input devices (e.g., keyboard and pointing devices), output devices (e.g., display devices), storage devices (e.g., disk drives), and network devices (e.g., network interfaces). The memory and storage devices are computer-readable storage media that may store instructions that implement at least portions of the described technology. In addition, the data structures and message structures may be stored or transmitted via a data transmission medium, such as a signal on a communications link. Various communications links may be used, such as the Internet, a local area network, a wide area network, or a point-to-point dial-up connection. Thus, computer-readable media can comprise computer-readable storage media (e.g., "non-transitory" media) and computer-readable transmission media.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims that follow.

We claim:

1. A system for providing a language classification of a media item, comprising:
   one or more processors; and
   a memory storing instructions that, when executed by the system, cause the system to perform operations for providing a language classification of a media item, the operations implementing:
     a context classifier to determine a context characteristic indicating one or more users who have interacted with the media item;
       wherein the context characteristic corresponds to a computed likelihood that the media item is in one or more languages based on determined language abilities of the users who have interacted with the media item; and
       wherein the context classifier is further to compute, based on the determined context characteristic and corresponding computed likelihood, a context prediction that the media item is in one or more first languages;
     a trained classifier to compute a trained prediction that the media item is in one or more second languages;
       wherein computing the trained prediction comprises an n-gram analysis of the media item, for one or more n-grams in the media item having a particular length, which analyzes a specified probability distribution that the n-gram is in a specific language; and
a language classifier to combine the context prediction with the trained prediction.

2. The system of claim 1, wherein the probability distribution is a distribution across multiple languages that gauges whether the media item is in each of the multiple languages.

3. The system of claim 1, wherein the language classifier is further to combine the context prediction with a prediction based on dictionary classifiers, wherein the dictionary classifiers select one or more words of the media item which indicate a particular probability that media items containing the selected words are in a certain language.

4. The system of claim 1, wherein the particular length for the trained n-gram analysis is four or five characters.

5. The system of claim 1, wherein the context classifier identifies the one or more users who have interacted with the media item as an author of the media item, and wherein the corresponding computed likelihood is based on a language associated with the author indicating the author is facile with the one or more first languages.

6. A method for building an n-gram classifier trained for analysis of social media content items, comprising:
storing training media items gathered from a social media source, wherein at least some of the training media items are associated with a language identifier indicating a language the media item is in, wherein each language identifier that indicates the language the media item is in is assigned based on one or more of:
a language model, associated with a user who created the media item, indicating that the user who created the media item is mono-linguistic; or
a common language identified by both a first language model associated with the user who created the media item and by a second language model associated with a user who received the media item; and
generating, for each of multiple selected n-grams from the training media items, a corresponding probability distribution that a particular media item is in a particular language given that the n-gram is in the particular media item;
wherein at least one probability distribution corresponding to one of the multiple selected n-grams is based on an analysis of a frequency with which that n-gram occurs in a subset of the training media items having the same language identifier.

7. The method of claim 6, wherein each of the multiple selected n-grams has a length of four or five characters.

8. The method of claim 6, wherein the multiple selected n-grams comprise all possible character sequences of a particular length in the training data.

9. The method of claim 6, wherein at least one probability distribution corresponding to one individual n-gram of the multiple selected n-grams includes a rate at which the individual n-gram appears across languages of the training media items.

10. A non-transitory computer readable storage medium storing instructions that, in response to being executed by a computing device, cause the computing device to perform operations for building an n-gram classifier trained for analysis of social media content items, the operations comprising:
storing training media items gathered from a social media source, wherein at least some of the training media items are associated with a language identifier indicating a language the media item is in, wherein each language identifier that indicates the language the media item is in is assigned based on one or more of:
a language model, associated with a user who created the media item, indicating that the user who created the media item is mono-linguistic; or
a common language identified by both a first language model associated with the user who created the media item and by a second language model associated with a user who received the media item; and
generating, for each of multiple selected n-grams from the training media items, a corresponding probability distribution that a particular media item is in a particular language given that the n-gram is in the particular media item;
wherein at least one probability distribution corresponding to one of the multiple selected n-grams is based on an analysis of a frequency with which that n-gram occurs in a subset of the training media items having the same language identifier.

11. The non-transitory computer readable storage medium of claim 10, wherein each of the multiple selected n-grams has a length of four or five characters.

12. The non-transitory computer readable storage medium of claim 10, wherein the multiple selected n-grams comprise all possible character sequences of a particular length in the training data.

13. The non-transitory computer readable storage medium of claim 10, wherein at least one probability distribution corresponding to one individual n-gram of the multiple selected n-grams includes a rate at which the individual n-gram appears across languages of the training media items.

* * * * *